United States Patent Office 3,420,693
Patented Jan. 7, 1969

3,420,693
GLASS HAVING DUAL PROTECTIVE COATINGS THEREON AND A METHOD FOR FORMING SUCH COATINGS
Addison B. Scholes, Muncie, and John E. Pickard, Selma, Ind., assignors to Ball Brothers Company Incorporated, Muncie, Ind., a corporation of Indiana
No Drawing. Filed June 5, 1964, Ser. No. 373,063
U.S. Cl. 117—72        9 Claims
Int. Cl. C03c *17/08;* C03c *17/32*

ABSTRACT OF THE DISCLOSURE

Method for treating glass by forming two coatings thereon, the first coating being a tin oxide coating produced by exposing heated virgin glass to a heat decomposable tin compound, and the second coating being a lubricous organic compound coated on the tin oxide coating, and an article produced by the method.

---

The present invention relates to a new and improved lubricous coating for glass and more particularly relates to an improved combination of coatings for glass articles such as glassware, and relates to a novel method of forming such a combination of coatings on glass.

Glassware such as bottles and jars is handled a great number of times during manufacture, inspection, shipping, filling, use, etc. During such handling, the ware comes into contact with various mechanical devices such as loaders, conveyors, inspection devices and the like and also contacts other pieces of ware and surfaces such as boxes, shelves, etc.

This high degree of contact may weaken the ware either by checking, scratching or other damage of the surface thereof. Increased breakage due to weakening of the ware creates a serious problem, particularly during processing when a line may jam requiring attention by a person, e.g., to clean the broken ware from the line. The possibility of interrupting of a line due to breakage of ware necessitates a higher degree of supervision than may actually be required. Breakage during processing is also serious because of the possibility of slivers or fragments of the shattered glass being deposited in adjacent ware which is undesirable in most situations and is completely unacceptable when the ware is to be used for food packaging.

Attempts have been made in the past to minimize or eliminate the above difficulties by the application of various pre-annealing and post-annealing coatings to glass. While the coatings proposed, in some cases, have reduced checking, scratching and other damage to a degree, the coatings have created different problems. In certain cases, it has been difficult to apply the coating composition to the ware and/or the coatings have colored the glass. Other coatings did not possess sufficient lubricity or the coatings were not durable and thus were unsuccessful. Many coatings were not acceptable because they had not been approved for use in food. Thus, none of the coatings proposed provided the desired combination of improved properties.

In view of the above and other difficulties and problems with coatings for glass heretofore employed, it was completely unexpected and surprising to discover a new and improved combination of coatings for glass which overcomes problems encountered in the past and, in addition, provides benefits and advantages heretofore unattainable. The coating combination of the present invention provides a lubricous surface on glass which reduces damage during handling to a minimum. Furthermore, the lubricity and durability of the coating combination are substantially greater than would be expected from observing the coatings individually. Moreover, the method of coating glass surfaces in accordance with the invention is simple and convenient and relatively low in cost. Another advantage of the coating combination of the invention is that the appearance of the glass is not changed. Moreover, the coating compositions employed to form the novel combination of coatings of the invention are readily formulated and easily applied to glass surfaces.

In accordance with the present invention, glass having a high degree of lubricity and a substantial improvement in durability is formed by applying a decomposable tin compound to virgin glass which still retains a portion of its heat of formation and subsequently applying an organic coating composition thereto. The glass article so produced has a colorless, uniform tin oxide coating which is believed to be chemically bonded to the virgin surface of the glass and an outer coating of a lubricous organic compound. Virgin glass or glass in a virgin state is newly-formed glass which has not been annealed or had an opportunity to be adversely affected by the elements and which still retains a portion of its heat of formation.

The tin compound is applied to the virgin glass while the glass is at a temperature above the decomposition temperature of the tin compound but below the solidification temperature of the glass. Advantageously, the glass is between about 900° and 1,500° F., and preferably between about 1,050° and 1,300° F. during treatment.

The decomposable tin compound may be either inorganic or organic in nature, for example, an inorganic salt such as a tin halide or an organic tin compound such as an alkyl or aryl tin, an alkyl or aryl tin salt, etc. Particularly useful are tin compounds such as stannous chloride, stannic chloride, stannous fluoride, diethyl isobutyl tin, diisopropyl tin dibromide, etc.

The decomposable tin compound advantageously is applied in vapor form or may be dissolved or dispersed in water or an organic solvent prior to application. For example, a stannic chloride vapor is advantageously formed by combining stannic chloride with a suitable carrier gas. Preferably, the gas is dry, that is, substantially moisture-free. Suitable carrier gases include air, nitrogen, argon and similar inert gases.

Liquid stannic chloride in its anhydrous form has a high vapor pressure at ambient temperatures so that the stannic chloride vapor employed in the method of the invention may advantageously be formed by passing a gas through liquid stannic chloride or the vapor above the liquid. The concentration of stannic chloride in the vapor is preferably between about 0.01% and 2.5% by weight of the vapor and particularly between about 0.1% and 1.5% by weight. The concentration of the stannic chloride in the vapor may be conveniently adjusted by varying the proportion of inert gas in the vapor. For example, the flow rate of gas through the stannic chloride liquid or vapor or the temperature of the liquid may be changed or additional inert gas may be mixed with the previously formed vapor to provide the desired concentration of stannic chloride. If desired, prior to the formation of the vapor, the stannic chloride liquid may be mixed with an inert liquid having a vapor pressure substantially equal to that of the stannic chloride.

The glass is advantageously exposed to the stannic chloride vapor in an enclosed chamber having a substantially uniform vapor atmosphere and preferably in a chamber in which the vapor surrounds the glass. The employment of a chamber with an exhaust facilitates the removal of the decomposition products from the chamber and facilitates the presence of a sufficiently high concentration of stannic chloride as a substantially uniform vapor in the chamber to form the colorless, uniform tin oxide coating of the invention.

The tin oxide film formed on the glass is very thin and advantageously is less than about one-fourth wavelength of visible light in thickness. As a result, the film is invisible to the eye and does not significantly change the appearance of the article.

The lubricous organic compound employed in the second coating composition of the invention may be polyethylene, a stearate such as polyoxyethylene monostearate, morpholino stearate, triethanolamine stearate and mixtures of such materials. The polyethylene is advantageously an emulsified polyethylene having a molecular weight less than about 4,000 and preferably between about 2,000 and 3,000. The stearates are generally waxy solids which are soluble in water.

Advantageously, polyethylene and polyoxyethylene monostearate are emulsified together in the preparation of the second coating composition. Preferably, the ratio of the compounds in the emulsion is between about 1 and 2.5 parts by weight of polyethylene for each part of polyoxyethylene monostearate.

In addition to the above organic compounds, a silicone may be employed as the second coating; however, silicones are considered less desirable because of the labeling problems generally encountered.

The second coating composition advantageously is an aqueous composition containing less than abut 2% by weight of the organic compound and preferably between about 0.01% and 1% by weight thereof.

In addition to the principal components of the organic coating composition as set forth above, other materials may be included therein provided they do not deleteriously affect the improved properties and characteristics of the coating. For example, a pigment may be incorporated in the coating composition and dispersing or emulsifying agents may be employed to facilitate mixing of the components of the coating composition. In addition, it may be desirable to improve the "shelf life" of the composition by incorporating stabilizers, bactericides, mold inhibitors or similar materials.

The organic coating composition may be applied to the glass by any convenient method and preferably by spraying or atomizing. Advantageously, the composition is applied to the glass while the glass is at an elevated temperature, e.g., above about 250° F. Coating of the glass may be conveniently accomplished as the glass emerges from the cold end of an annealing lehr.

The maximum temperature to which the organic coating is exposed is limited by the decomposition point of the compound and by the temperature which causes the glass to thermal shock, that is, cracking or crazing of the surface. Preferably, the coating is heated to a temperature in the range of about 250° and 300° F.

The invention will be described in detail with reference to the following examples. It is intended that the examples be illustrative of the invention and not limiting the invention to the specific procedures and conditions set forth. In the examples, parts and percentages are by weight.

EXAMPLE I

Stannic chloride vapor formed by bubbling argon from a pressure cylinder at a rate of about 1 cubic foot per hour through a vaporizer containing liquid stannic chloride at a temperature of about 110° F. was combined with a stream of argon having a flow rate of about 80 cubic feet per hour to form a vapor containing about 0.5% stannic chloride. The resulting vapor was sprayed onto the outer surface of a series of newly-formed glass jars as they passed on a conveyor from a forming machine to an annealing lehr. The temperature of the jars during the coating operation was approximately 1,050° F. The coating was accomplished in an enclosed area with an exhaust to remove any objectionable decomposition products.

After being coated the jars were passed through the annealing lehr and as they emerged were sprayed with a 0.1% aqueous solution of polyoxyethylene monostearate sold by Atlas Powder Co. as MYRJ52S. The jars were at a temperature of about 250° F. when sprayed.

Samples of the coated jars were selected and control samples were also selected from uncoated jars which were made immediately preceding and succeeding the coated jars. The coated jars had a coefficient of friction of about one-fourth that of similar uncoated jars.

The jars were used in a processing line in which each jar was filled and processed. Jamming of the processing line due to breakage or falling down of jars was greatly reduced with the coated jars as compared with uncoated jars processed in a similar manner.

The coefficient of friction of the coated and uncoated jars after processing was checked again, and it was found that the coated jars retained the same superior coefficient of friction as before processing.

EXAMPLE II

The procedure of this example was the same as that of Example I, except that the stannic chloride vapor contained about 1% stannic chloride in air having a dew point below about −90° F. Coated glass jars showed superiorities over uncoated jars similar to those exhibited by the coated jars of Example I.

EXAMPLE III

The procedure of this example was the same as that of Example I, except that the second coating composition was an aqueous emulsion of about 0.05% polyethylene having a molecular weight of about 2500 and 0.025% polyoxyethylene monostearate containing about 40 mols of polyoxyethylene per mole of stearate.

The above description and examples show that the present invention provides a novel coating combination for glass which has a high degree of lubricity. Moreover, the lubricity is substantially greater than would be expected by observing the coatings individually. Furthermore, the durability of the coated glass is substantially greater than that of uncoated glass. Another advantage of the coating of the invention is that the above improvements are achieved without significantly changing the appearance of the glass. In addition, the method of the invention for forming the coatings on glass is simple and convenient, and relatively low in cost. Further, the coating compositions of the invention are easily formulated and can be readily applied to glass surfaces.

What is claimed is:

1. Glassware of improved durability and lubricity having a plurality of coatings, one of which comprises a substantially colorless tin oxide coating adhered directly to a surface of said glassware and a second of which comprises a coating selected from the group consisting of polyethylene, polyoxyethylene monostearate, morpholino stearate, triethanolamine stearate, and mixtures thereof on said tin coating.

2. Glassware as set forth in claim 1 in which said second coating comprises polyoxyethylene stearate.

3. Glassware of improved durability and lubricity having a substantially colorless tin oxide coating directly adhered to said glassware, and a second coating comprising a mixture of polyethylene and polyoxyethylene stearate on said tin oxide coating.

4. A method of forming a glass article of improved durability and lubricity which comprises applying a heat decomposable tin compound to a virgin glass article at a temperature above the decomposition point of the tin compound to form a substantially colorless tin oxide coating, and applying an organic compound to the resulting tin oxide surface at a temperature above about 250° F., said organic compound being selected from the group consisting of polyethylene, polyoxyethylene monostearate, morpholino stearate, triethanolamine stearate, and mixtures thereof on said tin coating.

5. A method of forming a glass article of improved durability and lubricity which comprises applying a vapor of a decomposable tin compound to a virgin glass article at a temperature above the decomposition point of the tin compound, to form a substantially colorless coating directly on said article, annealing said coated article, and applying an organic compound to the resulting tin oxide coated surface at a temperature above about 250° F., said organic compound being selected from the group consisting of polyethylene, polyoxyethylene monostearate, morpholino stearate, triethanolamine stearate, and mixtures thereof on said tin coating.

6. A method of forming a glass article of improved durability and lubricity which comprises applying stannic chloride vapor to a virgin glass article at a temperature above about 900° F., to form a substantially colorless coating of tin oxide, and applying polyoxyethylene stearate to said tin oxide coated surface while said article is at a temperature above about 250° F.

7. A method of forming a glass article of improved durability and lubricity which comprises applying a decomposable tin compound to a virgin glass article at a temperature above the decomposition point of the tin compound to form a substantially colorless tin oxide coating directly on said glass article, and applying to the tin oxide coated surface an aqueous mixture containing up to about 2% by weight of an organic compound selected from the group consisting of polyethylene, polyoxyethylene monostearate, morpholino stearate, triethanolamine stearate, and mixtures thereof while said article is at a temperature above about 250° F.

8. A method of forming a glass article of improved durability and lubricity which comprises applying a vapor of a decomposable tin compound to a virgin glass article at a temperature above the decomposition point of the tin compound to form a substantially colorless tin oxide coating directly on said glass article, annealing said coated article, and applying to said tin oxide coated surface an aqueous mixture containing between about 0.01% and 1% by weight of an organic compound, while said article is at a temperature between about 250° F. and 300° F.; said organic compound being selected from the group consisting of polyethylene, polyoxyethylene monostearate, morpholino stearate, triethanolamine stearate, and mixtures thereof.

9. A method of forming a glass article of improved durability and lubricity which comprises applying a substantially moisture-free vapor containing between about 0.001% and 2.5% by weight of stannic chloride to a virgin glass article at a temperature above about 1050° F. to form a tin oxide coating directly on said glass article, annealing said coated article and applying to said tin oxide coated surface a mixture containing between about 0.01% and 1% by weight of polyoxyethylene stearate while said article is at a temperature above about 250° F.

References Cited

UNITED STATES PATENTS

| | | | |
|---|---|---|---|
| Re. 25,767 | 4/1965 | Auffenorde et al. | 117—124 X |
| 2,577,936 | 12/1951 | Waggoner | 117—72 |
| 2,595,800 | 5/1952 | McGraw et al. | 117—72 X |
| 2,813,045 | 11/1957 | Abbott | 117—124 X |
| 2,965,596 | 12/1960 | Sharf | 117—124 X |
| 2,995,533 | 8/1961 | Parmer et al. | 117—124 X |
| 3,019,135 | 1/1962 | Orr | 117—211 |
| 3,041,202 | 6/1962 | Whitehurst | 117—88 X |
| 3,199,966 | 8/1965 | O'Connell et al. | 65—60 X |

WILLIAM D. MARTIN, *Primary Examiner.*

R. HUSACK, *Assistant Examiner.*

U.S. Cl. X.R.

117—88, 124, 106, 94

Disclaimer 3,420,693.—*Addison B. Scholes*, Muncie, and *John E. Pickard*, Selma, Ind. GLASS HAVING DUAL PROTECTIVE COATINGS THEREON AND A METHOD FOR FORMING SUCH COATINGS. Patent dated Jan. 7, 1969. Disclaimer filed Nov. 12, 1971, by the assignee, *Ball Corporation*.

Hereby disclaims the portion of the term of the patent subsequent to Nov. 14, 1984.

[*Official Gazette March 7, 1972.*]